US011512655B2

(12) United States Patent
Petri et al.

(10) Patent No.: US 11,512,655 B2
(45) Date of Patent: Nov. 29, 2022

(54) FUEL TANK ISOLATION VALVE

(71) Applicants: Dominic Petri, Grafton, WI (US);
Andrew Biehl, Milwaukee, WI (US)

(72) Inventors: Dominic Petri, Grafton, WI (US);
Andrew Biehl, Milwaukee, WI (US)

(73) Assignee: TLX Technologies, LLC, Pewaukee, WI (US)

( * ) Notice: Subject to any disclaimer, the term of this patent is extended or adjusted under 35 U.S.C. 154(b) by 0 days.

(21) Appl. No.: 17/406,195

(22) Filed: Aug. 19, 2021

(65) Prior Publication Data

US 2022/0082057 A1 Mar. 17, 2022

Related U.S. Application Data

(60) Provisional application No. 63/079,145, filed on Sep. 16, 2020.

(51) Int. Cl.
| | | |
|---|---|---|
| *F02D 41/00* | (2006.01) | |
| *F02M 25/08* | (2006.01) | |
| *F16K 31/06* | (2006.01) | |
| *B01D 53/04* | (2006.01) | |

(52) U.S. Cl.
CPC ....... *F02D 41/003* (2013.01); *B01D 53/0415* (2013.01); *F02M 25/0836* (2013.01); *F16K 31/0679* (2013.01); *B01D 2253/102* (2013.01); *B01D 2257/702* (2013.01); *B01D 2259/4516* (2013.01); *F02D 2200/0404* (2013.01); *F02M 2025/0845* (2013.01)

(58) Field of Classification Search
CPC ..... Y10T 137/88062; Y10T 137/87917; F16K 1/44; F16K 31/0679; F16K 31/0655; F02D 41/003; F02D 2200/0404; B01D 53/0415; B01D 2253/102; B01D 2257/702; B01D 2259/4516; F02M 25/0836; F02M 2025/0845
See application file for complete search history.

(56) References Cited

U.S. PATENT DOCUMENTS

| | | | | |
|---|---|---|---|---|
| 3,339,664 A | * | 9/1967 | Beveridge | G05D 13/00 180/177 |
| 3,383,084 A | * | 5/1968 | Mayfield | F16K 31/0651 251/75 |
| 3,548,877 A | * | 12/1970 | Aumayer | F16K 31/0627 251/282 |
| 3,667,722 A | * | 6/1972 | Katz | G05D 16/2022 251/38 |

(Continued)

*Primary Examiner* — Phutthiwat Wongwian
*Assistant Examiner* — Sherman D Manley
(74) *Attorney, Agent, or Firm* — Reinhart Boerner Van Deuren P.C.

(57) ABSTRACT

A fuel tank isolation valve (FTIV) and methods of operation are provided. The FTIV includes first and second solenoid valves with the movable valve member of one of the solenoid valves seating against a movable valve member of the other one of the solenoid valves. One of the solenoid valves may be refueling valve allowing for evacuation of fuel vapor during refueling operations as well as to allow for purging high vapor pressure within the fuel tank. One of the solenoid valves may be a proportional valve used to control the flow of fuel vapor to an intake manifold of an operating internal combustion engine as well as to reduce a vacuum generated within the fuel tank.

30 Claims, 6 Drawing Sheets

(56) References Cited

U.S. PATENT DOCUMENTS

| | | | | | |
|---|---|---|---|---|---|
| 4,114,648 | A | * | 9/1978 | Nakajima | F16K 31/06 137/625.5 |
| 5,095,944 | A | * | 3/1992 | Hochstrasser | F16K 31/3855 251/38 |
| 5,339,777 | A | * | 8/1994 | Cannon | F15B 13/0402 123/90.11 |
| 5,598,871 | A | * | 2/1997 | Sturman | F16K 31/0613 137/625.68 |
| 5,720,261 | A | * | 2/1998 | Sturman | F02M 57/025 123/446 |
| 6,035,895 | A | * | 3/2000 | Grill | F16K 31/0627 251/129.1 |
| 6,085,991 | A | * | 7/2000 | Sturman | F02M 57/025 239/533.9 |
| 7,111,642 | B2 | * | 9/2006 | Takeda | F16K 31/0655 137/614.19 |
| 7,424,995 | B2 | * | 9/2008 | Oh | F16K 31/0679 251/129.1 |
| 2002/0029812 | A1 | * | 3/2002 | Hotta | F16K 1/443 137/613 |
| 2005/0022884 | A1 | * | 2/2005 | Takeda | F23N 1/005 137/614.21 |
| 2010/0171057 | A1 | * | 7/2010 | Lowe | F16K 31/0655 251/129.15 |
| 2013/0153062 | A1 | * | 6/2013 | Young | F23N 1/002 137/557 |
| 2014/0123964 | A1 | * | 5/2014 | Hatano | F16K 31/04 123/568.11 |
| 2016/0069473 | A1 | * | 3/2016 | Kucera | F16K 37/0091 137/637 |

\* cited by examiner

FUEL TANK ISOLATION VALVE

CROSS-REFERENCE TO RELATED PATENT APPLICATIONS

This patent application claims the benefit of U.S. Provisional Patent Application No. 63/079,145, filed Sep. 16, 2020, the entire teachings and disclosure of which are incorporated herein by reference thereto.

FIELD OF THE INVENTION

This invention generally relates to fuel tank isolation valves.

BACKGROUND OF THE INVENTION

Fuel tank isolation valves are used to control the flow of fuel vapor within a fuel system for an internal combustion engine and particularly in sealed fuel systems to avoid release of fuel vapor into the environment.

The present application is focused on improvements over the current state of the art as it relates to fuel tank isolation valves.

BRIEF SUMMARY OF THE INVENTION

A new and improved fuel tank isolation valve is provided. More particularly, a new and improved valve member seating arrangement for a fuel tank isolation valve is provided.

In an embodiment, a fuel tank isolation valve including a valve body, a first valve seat, a first solenoid valve and a second solenoid valve is provided. The valve body defines an inlet, an outlet and a flow path between the inlet and outlet. The first valve seat is located within the flow path between the inlet and outlet. The first solenoid valve has a first valve member that is configured to seat on the first valve seat. The first solenoid valve has a first armature operably connected to the first valve member for imparting movement to the first valve member between a seated position and unseated position relative to the first valve seat. The first valve member defines a first aperture therethrough and a second valve seat surrounding the first aperture. The second solenoid valve has a second valve member that is configured to seat on the second valve seat. The second solenoid valve has a second armature operably connected to the second valve member for imparting movement to the second valve member between a seated position and unseated position relative to the second valve seat.

When the first valve member is seated on the first valve seat and the second valve member is seated on the second valve seat, fluid communication between the inlet and outlet is prohibited through the flow path.

In one embodiment, the first solenoid valve is a latch valve and the second solenoid valve is a proportional valve.

In one embodiment, the first solenoid valve is actuated during refueling procedures (with the engine typically off) and the second solenoid valve is actuated during engine operation procedures.

In one embodiment, the first and second armatures move along first and second axes, respectively, that are parallel or coaxial to one another.

In one embodiment, the first valve member is an elastomeric material attached proximate a distal end of the first armature and the second valve member is a distal end of the second armature.

In one embodiment, the first and second solenoid valves are normally closed valves such that: 1) the first valve member is biased towards the seated position relative to the first valve seat; and 2) the second valve member is biased towards the seated position relative to the second valve seat.

In one embodiment, a first spring acts on the first valve member to bias the first valve member towards the seated position relative to the first valve seat and a second spring acts on the second valve member to bias the second valve member towards the seated position relative to the second valve seat.

In one embodiment, when an inlet pressure of the inlet is greater than an outlet pressure of the outlet to a first predetermined amount, the first valve member will transition from the seated position to the unseated position relative to the first valve seat without energizing the first solenoid valve.

In one embodiment, when the inlet pressure is less than the outlet pressure to a second predetermined amount, the second valve member will transition from the seated position to the unseated position relative to the second valve seat without energizing the second solenoid valve.

In one embodiment, a controller is configured for proportional flow control through the first aperture by selectively cycling the second valve member between the seated and unseated positions, by way of cyclically energizing and deenergizing the second solenoid valve.

In one embodiment, the controller controls the cycling of the second valve member between the seated and unseated positions based, at least in part, on a throttle position of an engine to which the fuel tank isolation valve controls, at least in part, the flow of fuel vapor from a gas tank holding fuel for the engine to the engine.

In one embodiment, the cycling of the second valve member between the seated and unseated positions allows a vacuum created by the engine to draw fuel vapor from the gas tank to the engine.

In one embodiment, a controller is configured to energize the first solenoid valve to maintain the first valve member in the unseated position for a predetermined amount of time.

In one embodiment, the controller is configured to energize the first solenoid valve to maintain, operably, the first valve member in the unseated position for a predetermined amount of time when an engine to which the fuel tank isolation valve controls, at least in part, the flow of fuel vapor from a gas tank holding fuel for the engine to the engine when the engine is turned off. Optionally, the controller is configured to energize the first solenoid valve to return, operably, the first valve member to the seated position.

In one embodiment, the controller is configured to energize the first solenoid valve to maintain the first valve member in the unseated position for a predetermined amount of time when an engine to which the fuel tank isolation valve controls, at least in part, the flow of fuel vapor from a gas tank holding fuel for the engine to the engine when the controller determines that the fuel tank is being refueled.

In one embodiment, the first solenoid valve is a latching solenoid valve. When the first solenoid valve is energized to transition the first valve seat to the unseated position, the armature is maintained in the unseated position when the latching solenoid valve is deenergized and then the latching solenoid valve is reenergized to transition the first valve set from the unseated position to the seated position.

In one embodiment, a controller is configured to energize the first solenoid valve to transition the first valve member to the unseated position. The first solenoid valve is a latching valve wherein the first armature is latched in the unseated position upon deenergization of the first solenoid and the first armature is only returned to the seated position upon unlatching of the first armature.

In one embodiment, the first armature is latched in the unseated position by a magnet, and wherein, optionally, the first armature is unlatched by removing the magnetic attraction between the magnet and the first armature.

In an embodiment, a system including a fuel tank, a vapor canister and a fuel tank isolation valve as outlined above is provided. The fuel tank has a fuel tank vapor outlet in communication with a fuel vapor region of the fuel tank. The vapor canister has a vapor canister inlet. The inlet of the fuel tank isolation valve is fluidly connected to the fuel tank vapor outlet. The outlet of the fuel tank isolation valve is fluidly connected to the vapor canister inlet.

In one embodiment, the system includes an internal combustion engine operably connected to a vapor canister outlet of the vapor canister. A controller is configured to cyclically energize the second solenoid valve upon activation of the internal combustion engine.

In one embodiment, the controller is configured to energize the first solenoid valve upon deactivation of the internal combustion engine.

In an embodiment a method of operating a fuel tank isolation valve interposed between a fuel tank and a fuel vapor canister and/or an internal combustion engine is provided. The method includes activating a first solenoid valve to transition a first valve member from a seated position in which the first valve member is seated against a first valve seat to an unseated position to fluidly communicate an inlet of a valve body with an outlet of the valve body by way of a flow path between the inlet and outlet. The method includes activating a second solenoid valve to transition a second valve member between a seated position and an unseated position. In the seated position, the second valve member is seated against a second valve seat surrounding a first aperture in the first valve member. The method includes transitioning the first valve member to the unseated position from the seated position due to a pressure differential between the inlet and outlet of the valve body with the pressure of the inlet is greater than pressure of the outlet, without activating either the first or second solenoid valves. The method includes transitioning the second valve member to the unseated position from the seated position due to a pressure differential between the inlet and outlet of the valve body with the pressure of the inlet is less than pressure of the outlet, without activating either the first or second solenoid valves.

In an embodiment, a method of operating a fuel tank isolation valve interposed between a fuel tank and a fuel vapor canister and/or an internal combustion engine is provided. The method includes activating a first solenoid valve to transition a first valve member from a seated position in which the first valve member is seated against a first valve seat to an unseated position to fluidly communicate an inlet of a valve body with an outlet of the valve body by way of a flow path between the inlet and outlet. The method includes filling the fuel tank with fuel while the first valve member is in the unseated position due to activating the second solenoid valve. The method includes activating a second solenoid valve to transition a second valve member between a seated position and an unseated position, in the seated position, the second valve member is seated against a second valve seat surrounding a first aperture in the first valve member. The method includes operating the internal combustion engine and drawing fuel vapor from the fuel tank due to a vacuum generated by the internal combustion engine while the second valve member is in the unseated position due to activating the second solenoid valve. The method includes transitioning the first valve member to the unseated position from the seated position due to a first pressure differential between the inlet and outlet of the valve body with the pressure of the inlet is greater than pressure of the outlet, without activating either the first or second solenoid valves, reducing the pressure differential by flowing fuel vapor from the fuel tank to the vapor canister via the first valve seat. The method includes transitioning the second valve member to the unseated position from the seated position due to a second pressure differential between the inlet and outlet of the valve body with the pressure of the inlet is less than pressure of the outlet, without activating either the first or second solenoid valves, reducing the second pressure differential by flowing fuel vapor or air from the vapor canister to the fuel tank via the first aperture.

In one method activating the second solenoid valve occurs when the engine is operating.

In one method, the method includes latching the first valve member in the unseated position without energizing the first solenoid valve after activating the first solenoid valve to transition the first valve member to the unseated position.

One method includes returning the first valve member to the seated position by unlatching the first valve member.

In one method, unlatching occurs when a fueling operation has stopped or the engine has been activated.

In one method, activating the second solenoid valve includes cyclically energizing and deenergizing the second solenoid valve to control a flow of fuel vapor through the fuel tank isolation valve from the inlet to the outlet.

In one method, the step of activating the first solenoid valve occurs when the engine is turned off.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
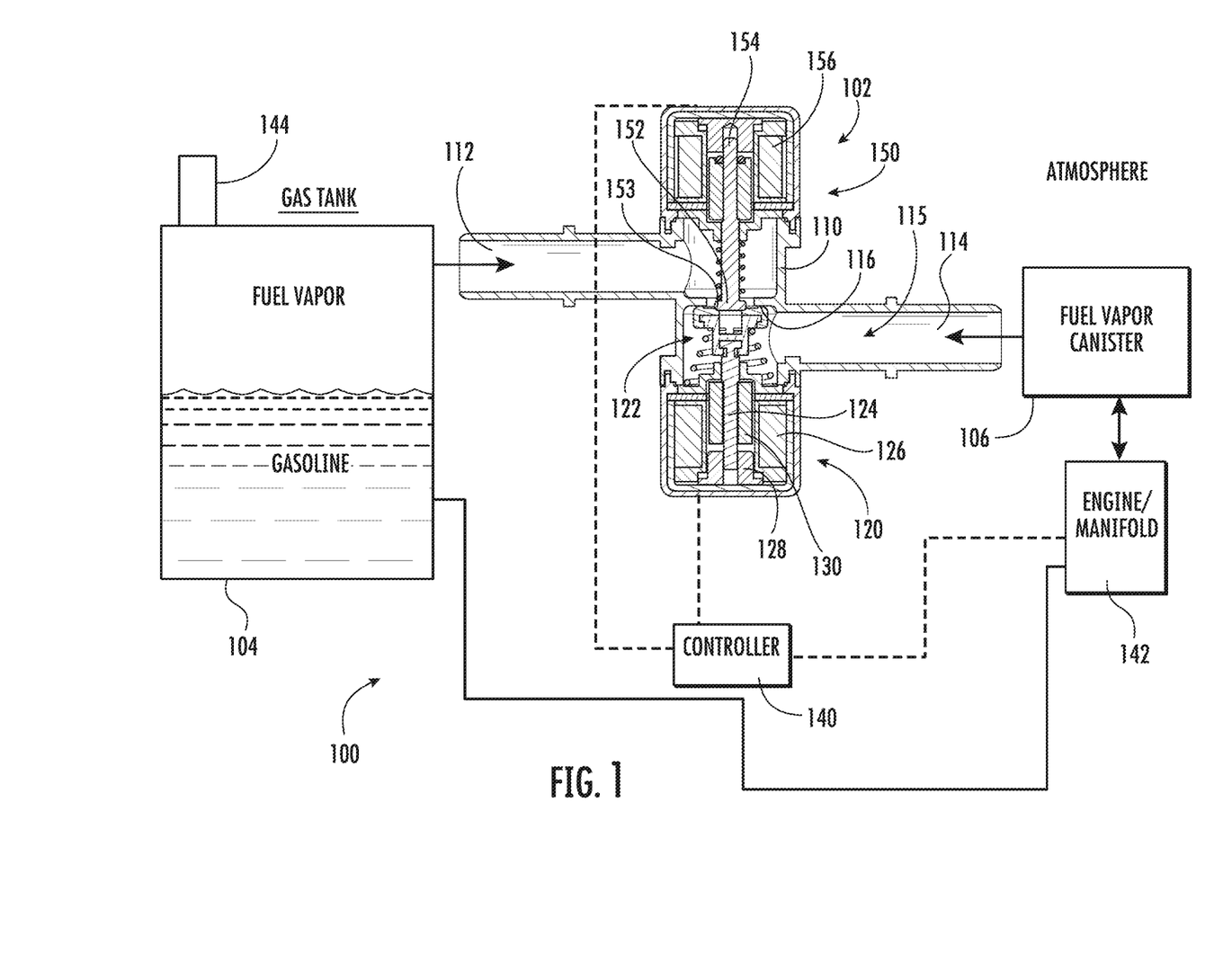
FIG. 1 is a schematic illustration of a fuel tank isolation valve interposed between a fuel tank and a fuel vapor canister according to an implementation of the application.

FIG. 1 illustrates a portion of a fuel system 100 that incorporates a fuel tank isolation valve 102 (FTIV 102) that controls the flow of fuel vapors between a fuel tank 104 and a fuel vapor canister 106 of the system 100.

In one embodiment, the fuel vapor canister 106 is a activated charcoal device.

Figure 2:
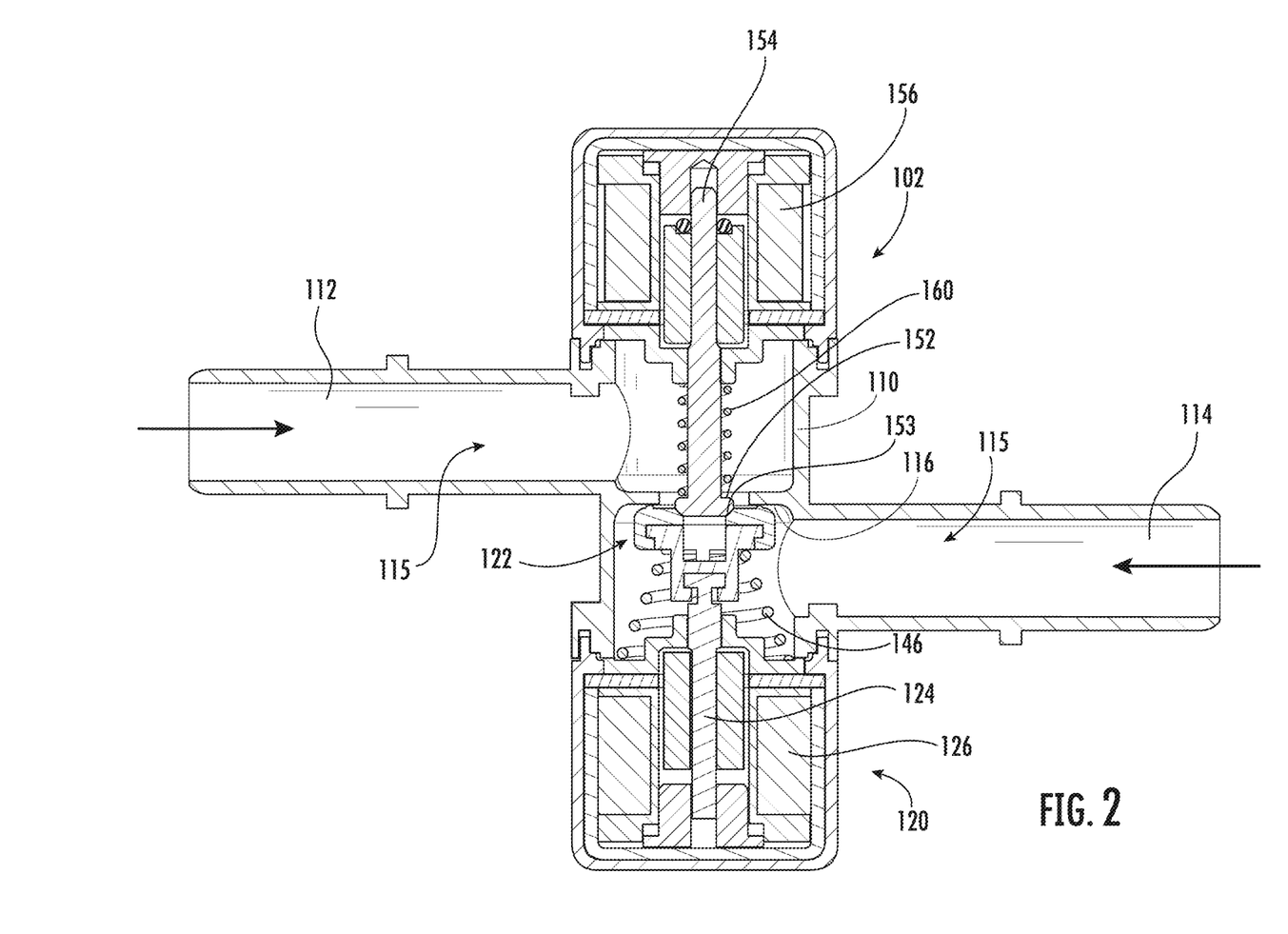
FIG. 2 is an enlarged cross-sectional illustration of the fuel tank isolation valve of FIG. 1 with the first and second solenoid valves in seated positions.

The FTIV 102 includes a valve body 110 that has an inlet 112 and an outlet 114 with a flow path 115 extending therebetween.

A first valve seat 116 is positioned within the flow path 115 between the inlet 112 and outlet 114. In this embodiment, the first valve seat 116 is directly provided by the valve body 110. However, it could be a separate component attached to the valve body 110.

The FTIV 102 includes a first solenoid valve 120 in the form of a latching solenoid valve. The first solenoid valve 120 may also be referred to as a refueling valve as it is often actuated to facilitate purging fuel vapor from the fuel tank 104 during refueling operations.

The first solenoid valve 120 has a first valve member 122 that is configured to seat on first valve seat 116. The first valve member 122 is operably attached to a first armature 124 of the first solenoid valve 120. In this embodiment, the first valve member 122 is a separate component from armature 124 and is formed from an elastomeric material. In other embodiments, the first valve member 122 may be operably attached to the first armature 124 by being formed with the rest of the first armature 124 as a single piece.

Figure 3:
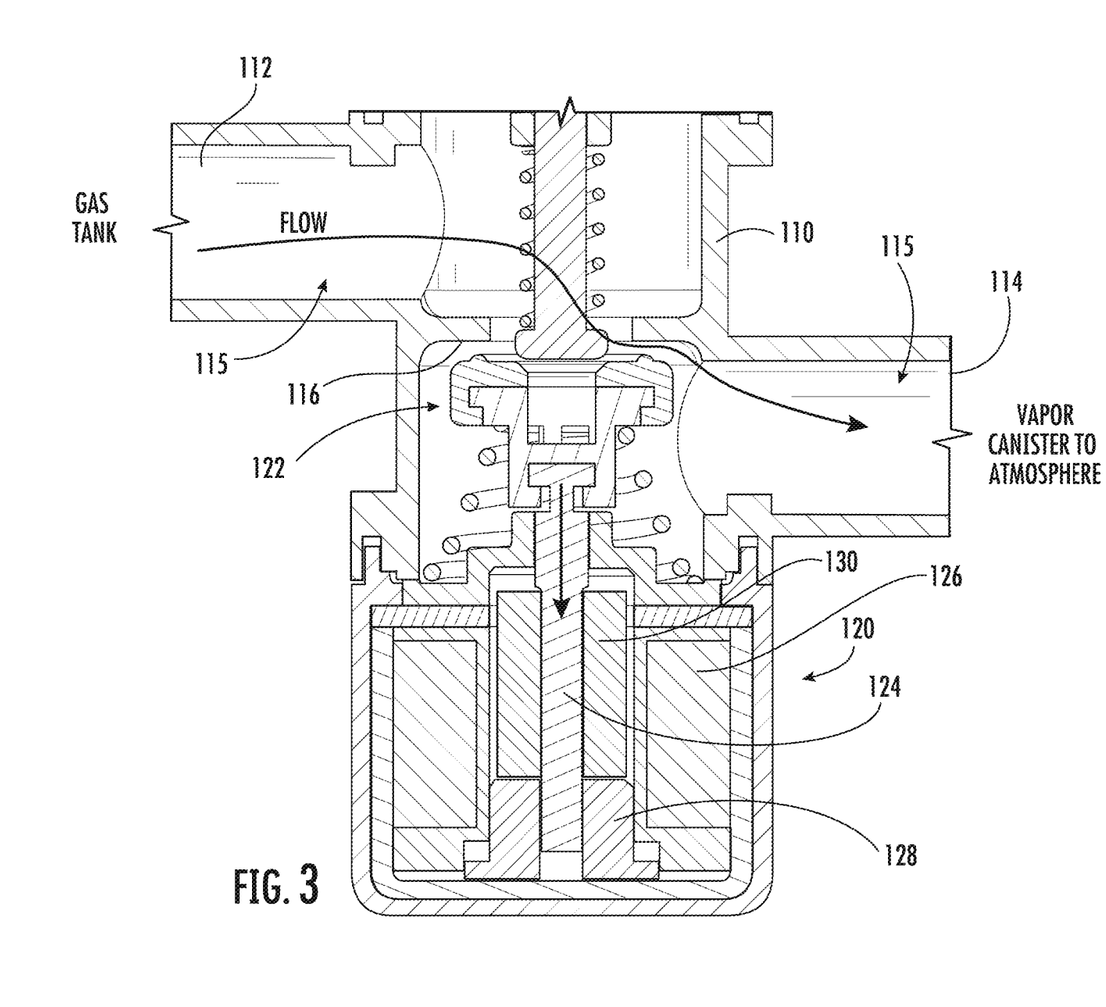
FIGS. 3 and 4 illustrate the first solenoid valve of the fuel tank isolation valve of FIG. 2 in an unseated position.
Figure 4:
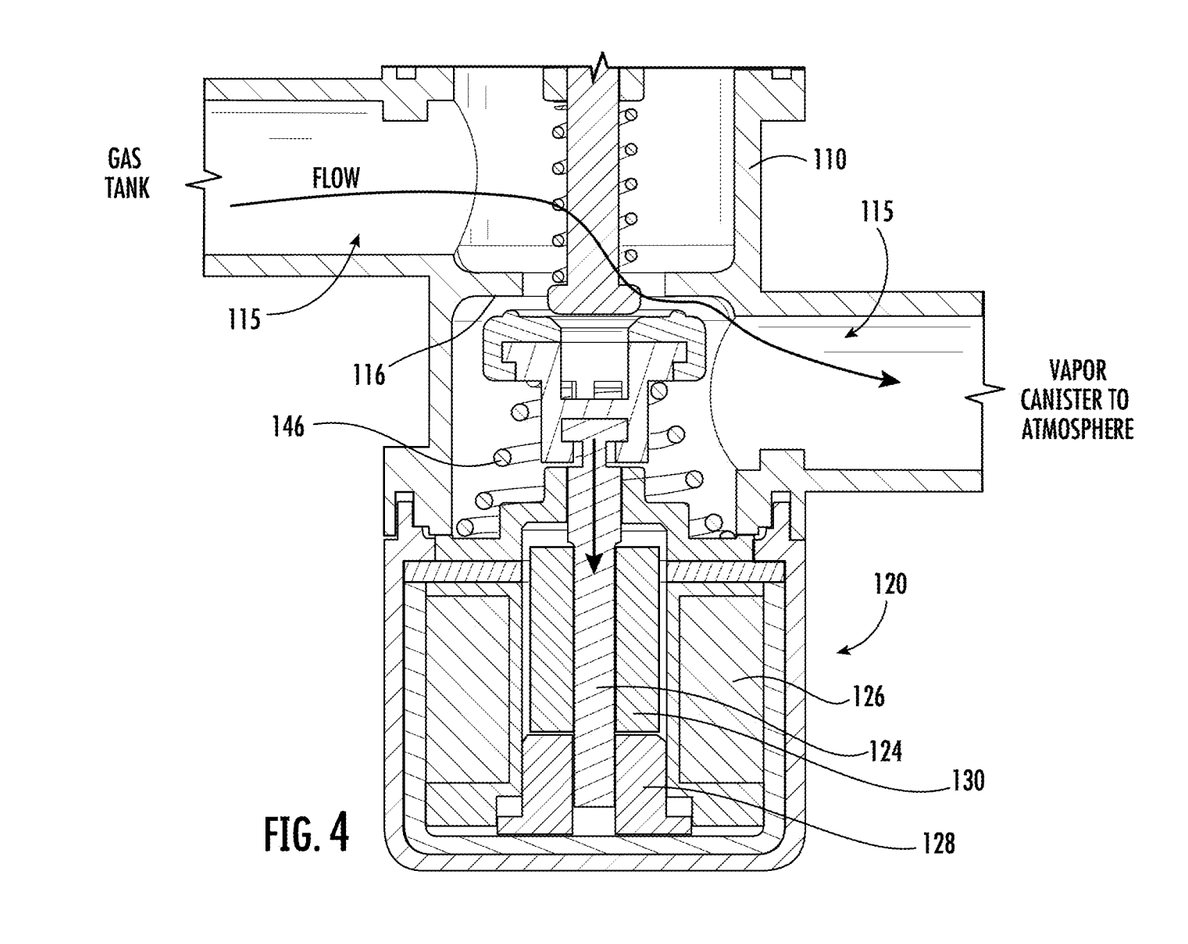

The first solenoid valve 120 includes a coil 126 for selectively driving the first valve member 122 and consequently the first armature 124 between a seated position in which first valve member 122 is seated against first valve seat 116 preventing fluid flow therebetween (see e.g. FIGS. 1 and 2) and an unseated position in which the first valve member 122 is spaced away from first valve seat 116 permitting fluid flow therebetween (see e.g. FIGS. 3 and 4).

In this embodiment, as the first solenoid valve 120 is a latching solenoid valve, the first solenoid valve 120 includes a latching structure for securing the first armature 124 and consequently the first valve member 122 in the unseated position when the coil 126 is not energized. In a preferred embodiment, the latching structure is magnet 128. In some embodiments, the magnetic connection between magnet 128 and first armature 124 can be removed by energizing the coil 126 or by energizing a second electromagnet, such as electromagnet 130 that would be repulsed by magnet 128.

Controller 140 of the system 100 can selectively energize coil 126 to transition from the seated position to the unseated position. In some systems 100, this is done when a triggering event is sensed by the controller. For instance, a triggering event could be the internal combustion engine 142 to which fuel from fuel tank 104 is being supplied is turned off. Alternatively, a triggering event could be the sensing of a fuel pump being inserted into the fuel inlet port 144.

This can be useful for refueling of the fuel tank 104. More particularly, as fuel storage systems are now typically sealed to prevent escape of fuel vapors and thus reducing hazardous emissions, as the fuel tank 104 is being filled, the fuel vapors located within the fuel tank 104 above the liquid fuel must be evacuated from the fuel tank 104 to avoid excess pressure within the fuel tank 104. This allows for higher flow rates of fuel from the pump as fuel flows into the tank through fuel inlet port 144 during the refueling process.

By opening the flow path between the inlet 112 and outlet 114 gas vapors within the fuel tank 104 are allowed to flow to the fuel vapor canister 106 during the refueling process.

As such, activation of the first solenoid valve 120 is performed when it is desired to fluidly connect the inlet 112 with the outlet 114.

The controller 140 may be configured to automatically return the first valve member 122 to the seated position. This could be done after a predetermined amount of time or upon a triggering event. The triggering event could be the removal of a fuel pump from the fuel inlet port 144 or it could be upon the starting of engine 142.

In some embodiments, the solenoid valve need not be a latching valve (e.g. one where the solenoid valve is deenergized and the armature remains in the unseated position). Instead, the first solenoid valve 120 could simply be energized until it is desired to release the armature back to the seated position (e.g. after a predetermined length of time or until a triggering event e.g. termination of refueling or activation of the engine).

With particular reference to FIG. 4, in addition to being driven between the unseated and seated positions, the first valve member 122 is configured for mechanical over pressure relief of pressure within the fuel tank 104. More particularly, when pressure P1 within the fuel tank 104 rises above pressure P2 of the vapor canister 106 (which will typically be atmospheric pressure), resulting pressure imbalance, when sufficiently large, can drive first valve member 122 from the seated position to the unseated position.

One example where this may be useful is if the engine 142 is in active such that the flow path 115 is not otherwise opened by the FTIV 102 and the temperature of the fuel tank 104 begins to rise increasing the fuel vapor pressure (e.g. pressure P1) within the fuel tank 104.

This allows for the relief of the pressure within the fuel tank 104 without requiring power of the solenoids in the FTIV 102 and particularly first solenoid valve 120.

The first valve member 122 is biased towards the seated position by a spring 146. The spring 146 is configured to set the pressure differential between pressure P1 and pressure P2 at which point pressure relief is provided.

The FTIV 102 includes a second solenoid valve 150 in the form of a proportional flow control valve. The second solenoid valve 150 controls the flow of fuel vapor from the fuel tank 104 during operation of engine 142. More particularly, when the engine 142 is operating, vacuum generated by the engine 142 pulls fuel vapor from the fuel tank 104 to the intake manifold of the engine 142 where it is combusted. This is how the fuel vapor is removed from the system.

The second solenoid valve 150 has a second valve member 152 that is configured to seat on a second valve seat 153 that surrounds a flow aperture 155 formed in the first valve member 122. The flow aperture 155 provides a fluid path between inlet 112 and outlet 114, when in an open state.

The second valve member 152 is operably attached to a second armature 154 of the second solenoid valve 150. In this embodiment, the second valve member 152 is a distal end portion of the second armature 154 and more particularly an enlarged end portion of second armature 154. In other embodiments, the second valve member 152 could be a separate component attached to the second armature 154.

Figure 5:
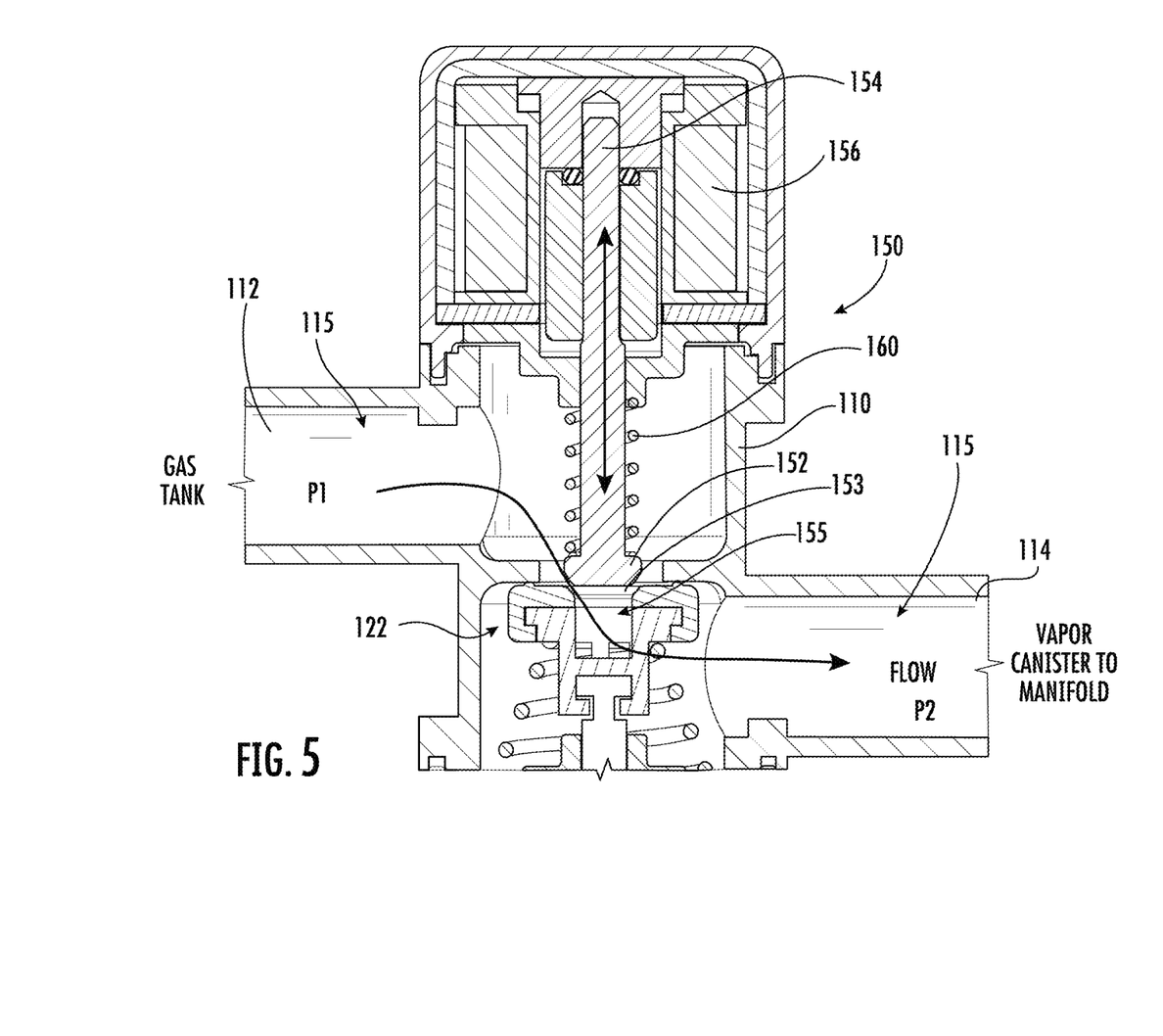
FIGS. 5 and 6 illustrate the second solenoid valve of the fuel tank isolation valve of FIG. 2 in an unseated position.
Figure 6:
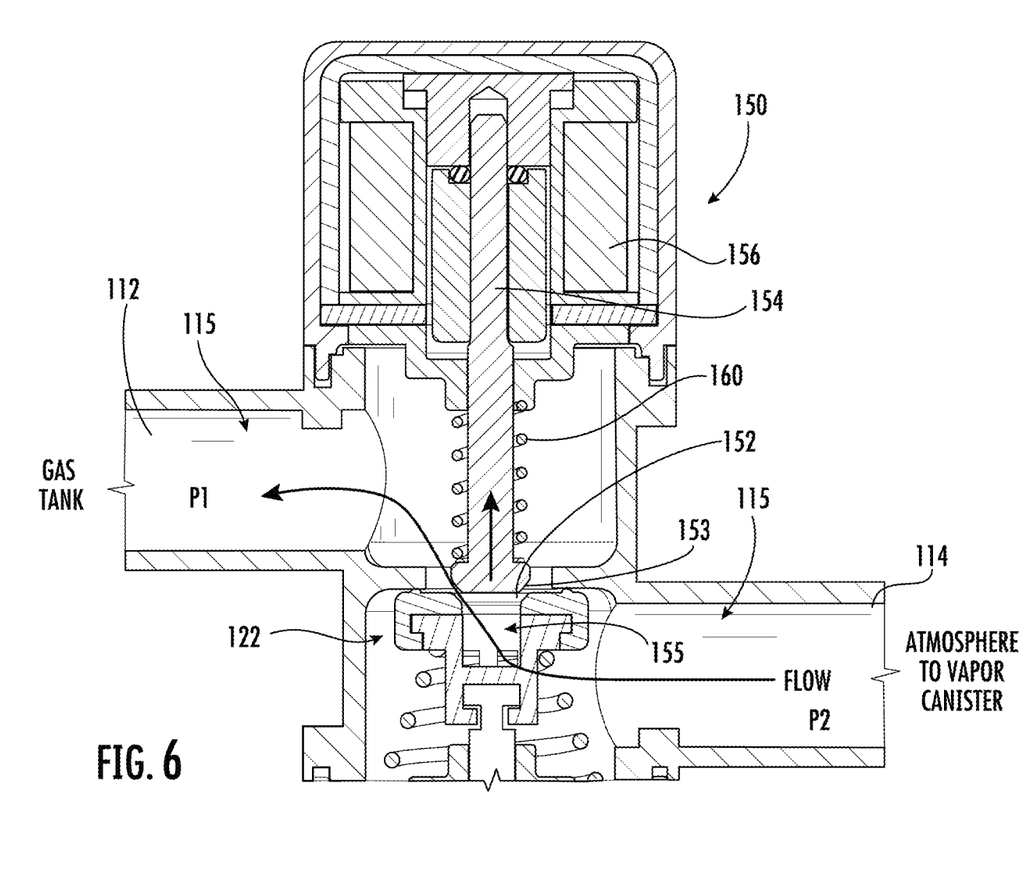

The second solenoid valve 150 includes a coil 156 for selectively driving the second valve member 152 and consequently the second armature 154 between a seated position in which second valve member 152 is seated against second valve seat 153 preventing fluid flow therebetween (see e.g. FIGS. 1 and 2) and an unseated position in which the second valve member 152 is spaced away from first valve seat 153 permitting fluid flow therebetween (see e.g. FIGS. 5 and 6).

A spring 160 biases the second armature 154 towards the seated position when the coil 156 is deenergized.

Controller 140 of the system 100 can selectively energize coil 156 to transition from the seated position to the unseated position. In some systems 100, this is typically done when the engine 142 is active, as noted above. In some systems 100, controller 140 is configured to cyclically cycle the second valve member 152 between the seated and unseated positions. The cycling between the seated and unseated positions will typically be based, at least in part, on inputs from the engine such as the throttle position. Thus, the second solenoid valve 150 can be considered a proportional solenoid valve as the operation thereof can adjust the amount of flow by adjusting the cycling between the unseated (open) position and the seated (closed) position. This is a form of pulse-width modulation.

With reference to FIG. 6, in addition to using the controller 140 to control the position of the second valve member 152, the second valve member 152 can be used to provide a mechanical vacuum relief More particularly, when the pressure P2 of the vapor canister 106 rises significantly above pressure P2 of the fuel vapor within the fuel tank 104, the pressure differential will force the second valve member 152 off of the second valve seat 153.

This pressure differential will typically occur when the temperature of the fuel tank 104 drops reducing the fuel vapor pressure within the fuel tank 104 (e.g. pressure P1) such that a vacuum is generated on the inlet side of the FTIV 102. In this situation, vapor or air is drawn from the vapor canister 106.

Spring 160 is configured such that a desired pressure differential between P2 and P1 is required to cause actuation of second valve member 152.

It should be noted that this actuation of the second valve member 152 occurs without powering the second solenoid valve 150 and particularly the coil 156 thereof.

Notably, in the illustrated embodiment, the first and second armatures 124, 154 are actuated along axes that are generally parallel to one another and particularly co-axial. Further, in this configuration, the first and second solenoid valves 120, 150 are generally on opposed sides of the first valve seat 116 and electrical activation of either solenoid valve 120, 150 draws the armature 124, 154 away from the other solenoid valve 120, 150.

Further, when the solenoid valves are deenergized and the pressure differential between pressures P1 and P2 is sufficiently small, the FTIV 102 has the flow path 115 closed such that the inlet 112 is not in fluid or vapor communication with outlet 114 through valve body 110 and by way of flow path 115.

Methods of operating the first and second solenoid valves electrically or due to differential pressure are contemplated for 1) purging fuel vapor from the fuel tank during tank refueling operations; 2) purging fuel vapor from the fuel tank upon a pressure differential across the FTIV 102 upon an increase in temperature of the fuel tank 104 and fuel/fuel vapor therein; 3) purging fuel vapor from the fuel tank by using a vacuum generated by the internal combustion engine; and/or 4) eliminating a vacuum within the fuel tank 104 upon a pressure differential cross the FTIV 102 upon a decrease in temperature of the fuel tank 104 and fuel/fuel vapor therein.

Methods of controlling the first and second solenoid valves 120, 150 as latch valves and proportional valves (e.g. using PWM) with a controller 140 are also contemplated.

Methods of flowing fuel vapor through an aperture in the valve member 120 of the refueling valve 120 to purge fuel vapor from within the fuel tank 104 during engine 142 operation are contemplated. The methods may include PWM control of the second solenoid valve 150.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel tank isolation valve comprising:
 a valve body defining an inlet, an outlet and a flow path between the inlet and outlet;
 a first valve seat located within the flow path between the inlet and outlet;
 a first solenoid valve having a first valve member that is configured to seat on the first valve seat, the first solenoid valve having a first armature operably connected to the first valve member for imparting movement to the first valve member between a seated position and unseated position relative to the first valve seat, the first valve member defining a first aperture therethrough and a second valve seat surrounding the first aperture; and
 a second solenoid valve having a second valve member that is configured to seat on the second valve seat, the second solenoid valve having a second armature operably connected to the second valve member for imparting movement to the second valve member between a seated position and unseated position relative to the second valve seat;
wherein:
 the first and second solenoid valves are normally closed valves such that:

the first valve member is biased towards the seated position relative to the first valve seat; and the second valve member is biased towards the seated position relative to the second valve seat.

2. The fuel tank isolation valve of claim 1, wherein the second solenoid valve is a proportional valve.

3. The fuel tank isolation valve of claim 1, wherein the first and second armatures move along first and second axes, respectively, that are parallel or coaxial to one another.

4. The fuel tank isolation valve of claim 1, wherein the first valve member is an elastomeric material attached proximate a distal end of the first armature and the second valve member is a distal end of the second armature.

5. The fuel tank isolation valve of claim 1, wherein a first spring acts on the first valve member to bias the first valve member towards the seated position relative to the first valve seat and a second spring acts on the second valve member to bias the second valve member towards the seated position relative to the second valve seat.

6. The fuel tank isolation valve of claim 1, wherein when an inlet pressure of the inlet is greater than an outlet pressure of the outlet to a first predetermined amount, the first valve member will transition from the seated position to the unseated position relative to the first valve seat without energizing the first solenoid valve.

7. The fuel tank isolation valve of claim 1, when the inlet pressure is less than the outlet pressure to a second predetermined amount, the second valve member will transition from the seated position to the unseated position relative to the second valve seat without energizing the second solenoid valve.

8. The fuel tank isolation valve of claim 1, further comprising a controller configured for proportional flow control through the first aperture by selectively cycling the second valve member between the seated and unseated positions, by way of cyclically energizing and deenergizing the second solenoid valve.

9. The fuel tank isolation valve of claim 1, further comprising a controller configured to energize the first solenoid valve to maintain the first valve member in the unseated position.

10. The fuel tank isolation valve of claim 1, wherein when the first valve member is seated on the first valve seat and the second valve member is seated on the second valve seat, fluid communication between the inlet and outlet is prohibited.

11. A fuel tank isolation valve comprising:
a valve body defining an inlet, an outlet and a flow path between the inlet and outlet;
a first valve seat located within the flow path between the inlet and outlet;
a first solenoid valve having a first valve member that is configured to seat on the first valve seat, the first solenoid valve having a first armature operably connected to the first valve member for imparting movement to the first valve member between a seated position and unseated position relative to the first valve seat, the first valve member defining a first aperture therethrough and a second valve seat surrounding the first aperture;
a second solenoid valve having a second valve member that is configured to seat on the second valve seat, the second solenoid valve having a second armature operably connected to the second valve member for imparting movement to the second valve member between a seated position and unseated position relative to the second valve seat;
a controller configured for proportional flow control through the first aperture by selectively cycling the second valve member between the seated and unseated positions, by way of cyclically energizing and deenergizing the second solenoid valve; and
wherein the controller controls the cycling of the second valve member between the seated and unseated positions based, at least in part, on a throttle position of an engine to which the fuel tank isolation valve controls, at least in part, the flow of fuel vapor from a gas tank holding fuel for the engine to the engine.

12. The fuel tank isolation valve of claim 11, wherein the cycling of the second valve member between the seated and unseated positions allows a vacuum created by the engine to draw fuel vapor from the gas tank to the engine.

13. The fuel tank isolation valve of claim 12, wherein the controller is configured to energize the first solenoid valve to maintain the first valve member in the unseated position when an engine to which the fuel tank isolation valve controls, at least in part, the flow of fuel vapor from a gas tank holding fuel for the engine to the engine when the controller determines that the fuel tank is being refueled.

14. A fuel tank isolation valve comprising:
a valve body defining an inlet, an outlet and a flow path between the inlet and outlet;
a first valve seat located within the flow path between the inlet and outlet;
a first solenoid valve having a first valve member that is configured to seat on the first valve seat, the first solenoid valve having a first armature operably connected to the first valve member for imparting movement to the first valve member between a seated position and unseated position relative to the first valve seat, the first valve member defining a first aperture therethrough and a second valve seat surrounding the first aperture; and
a second solenoid valve having a second valve member that is configured to seat on the second valve seat, the second solenoid valve having a second armature operably connected to the second valve member for imparting movement to the second valve member between a seated position and unseated position relative to the second valve seat;
a controller configured to energize the first solenoid valve to maintain the first valve member in the unseated position; and
wherein the controller is configured to energize the first solenoid valve to maintain, operably, the first valve member in the unseated position when an engine to which the fuel tank isolation valve controls, at least in part, the flow of fuel vapor from a gas tank holding fuel for the engine to the engine when the engine is turned off, wherein, optionally, the controller is configured to energize the first solenoid valve to return, operably, the first valve member to the seated position.

15. A system comprising:
a fuel tank having a fuel tank vapor outlet in communication with a fuel vapor region of the fuel tank;
a vapor canister having a vapor canister inlet; and
a fuel tank isolation valve including:
a valve body defining an inlet, an outlet and a flow path between the inlet and outlet, the inlet of the fuel tank isolation valve being fluidly connected to the fuel tank vapor outlet, the outlet of the fuel tank isolation valve being fluidly connected to the vapor canister inlet;

a first valve seat located within the flow path between the inlet and outlet;

a first solenoid valve having a first valve member that is configured to seat on the first valve seat, the first solenoid valve having a first armature operably connected to the first valve member for imparting movement to the first valve member between a seated position and unseated position relative to the first valve seat, the first valve member defining a first aperture therethrough and a second valve seat surrounding the first aperture; and a second solenoid valve having a second valve member that is configured to seat on the second valve seat, the second solenoid valve having a second armature operably connected to the second valve member for imparting movement to the second valve member between a seated position and unseated position relative to the second valve seat.

16. The system of claim 15 further comprising:

an internal combustion engine operably connected to a vapor canister outlet of the vapor canister; and a controller configured to cyclically energize the second solenoid valve upon activation of the internal combustion engine, the controller is configured to energize the first solenoid valve upon deactivation of the internal combustion engine.

17. A method of operating a fuel tank isolation valve interposed between a fuel tank and a fuel vapor canister and/or an internal combustion engine comprising:

activating a first solenoid valve to transition a first valve member from a seated position in which the first valve member is seated against a first valve seat to an unseated position to fluidly communicate an inlet of a valve body with an outlet of the valve body by way of a flow path between the inlet and outlet;

activating a second solenoid valve to transition a second valve member between a seated position and an unseated position, in the seated position, the second valve member is seated against a second valve seat surrounding a first aperture in the first valve member;

transitioning the first valve member to the unseated position from the seated position due to a pressure differential between the inlet and outlet of the valve body with the pressure of the inlet is greater than pressure of the outlet, without activating either the first or second solenoid valves; and transitioning the second valve member to the unseated position from the seated position due to a pressure differential between the inlet and outlet of the valve body with the pressure of the inlet is less than pressure of the outlet, without activating either the first or second solenoid valves.

18. The method of claim 17, wherein activating the second solenoid valve occurs when the engine is operating.

19. The method of claim 18, wherein activating the second solenoid valve includes cyclically energizing and deenergizing the second solenoid valve to control a flow of fuel vapor through the fuel tank isolation valve from the inlet to the outlet.

20. The method of claim 17, further comprising maintaining the first valve member in the unseated position after activating the first solenoid valve to transition the first valve member to the unseated position.

21. The method of claim 20, further comprising returning the first valve member to the seated position.

22. The method of claim 21, wherein returning the first valve member to the seated position occurs when a fueling operation has stopped or the engine has been activated.

23. The method of claim 17, wherein the step of activating the first solenoid valve occurs when the engine is turned off.

24. A method of operating a fuel tank isolation valve interposed between a fuel tank and a fuel vapor canister and/or an internal combustion engine comprising:

activating a first solenoid valve to transition a first valve member from a seated position in which the first valve member is seated against a first valve seat to an unseated position to fluidly communicate an inlet of a valve body with an outlet of the valve body by way of a flow path between the inlet and outlet;

filling the fuel tank with fuel while the first valve member is in the unseated position due to activating the second solenoid valve;

activating a second solenoid valve to transition a second valve member between a seated position and an unseated position, in the seated position, the second valve member is seated against a second valve seat surrounding a first aperture in the first valve member;

operating the internal combustion engine and drawing fuel vapor from the fuel tank due to a vacuum generated by the internal combustion engine while the second valve member is in the unseated position due to activating the second solenoid valve;

transitioning the first valve member to the unseated position from the seated position due to a first pressure differential between the inlet and outlet of the valve body with the pressure of the inlet is greater than pressure of the outlet, without activating either the first or second solenoid valves, reducing the pressure differential by flowing fuel vapor from the fuel tank to the vapor canister via the first valve seat; and transitioning the second valve member to the unseated position from the seated position due to a second pressure differential between the inlet and outlet of the valve body with the pressure of the inlet is less than pressure of the outlet, without activating either the first or second solenoid valves, reducing the second pressure differential by flowing fuel vapor or air from the vapor canister to the fuel tank via the first aperture.

25. The method of claim 24, wherein activating the second solenoid valve occurs when the engine is operating.

26. The method of claim 25, wherein activating the second solenoid valve includes cyclically energizing and deenergizing the second solenoid valve to control a flow of fuel vapor through the fuel tank isolation valve from the inlet to the outlet.

27. The method of claim 24, further comprising maintaining the first valve member in the unseated position after activating the first solenoid valve to transition the first valve member to the unseated position.

28. The method of claim 27, further comprising returning the first valve member to the seated position.

29. The method of claim 28, wherein returning the first valve member to the seated position occurs when a fueling operation has stopped or the engine has been activated.

30. The method of claim 24, wherein the step of activating the first solenoid valve occurs when the engine is turned off.

* * * * *